Figure 1:
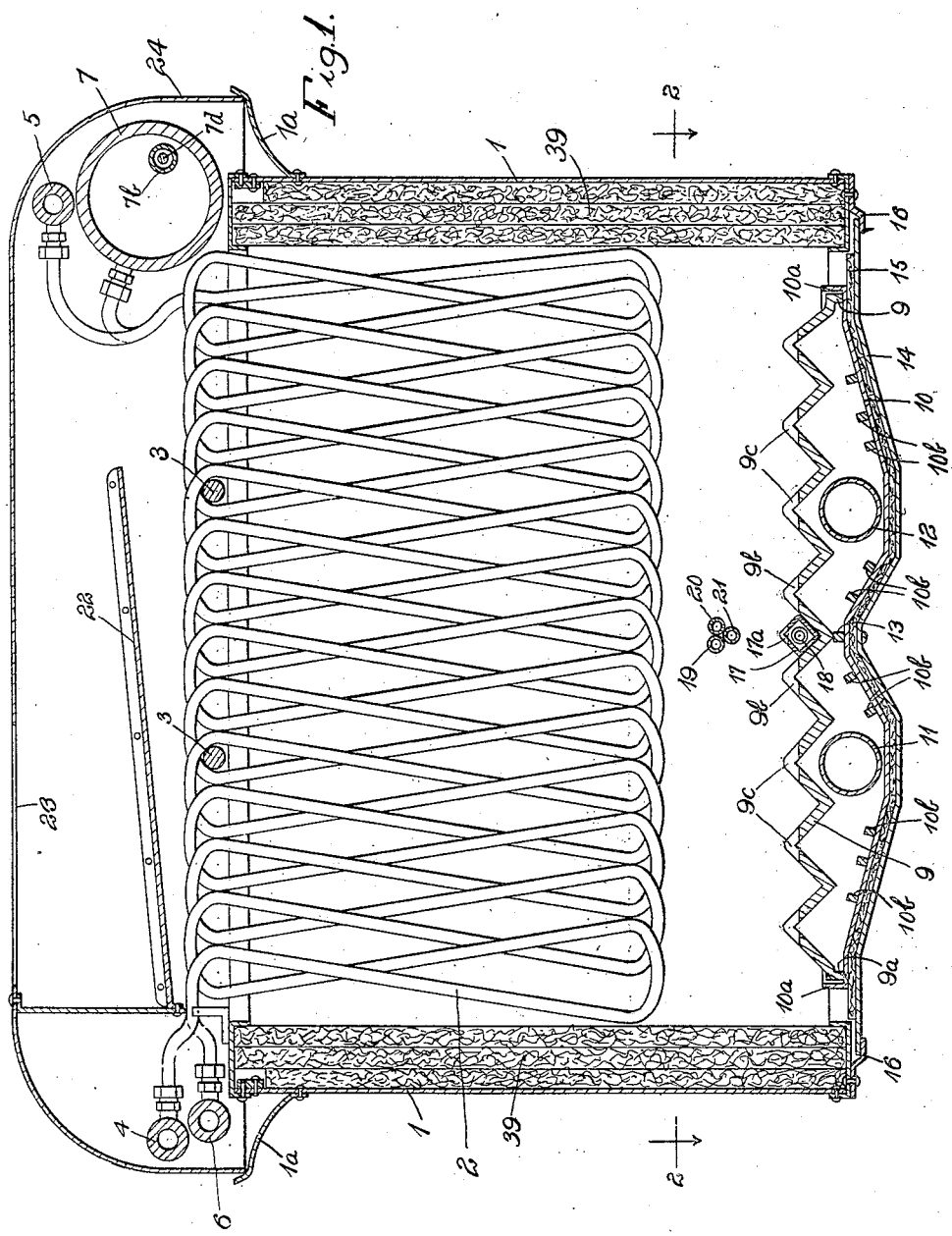

W. H. WINSLOW.
FLASH BOILER.
APPLICATION FILED NOV. 5, 1909.

1,065,419.

Patented June 24, 1913.

6 SHEETS—SHEET 1.

Witnesses
George C. Higham
Frank J. Thelen

Inventor
William H. Winslow
By Brown Williams
Attorneys

W. H. WINSLOW.
FLASH BOILER.
APPLICATION FILED NOV. 5, 1909.

1,065,419.

Patented June 24, 1913.
6 SHEETS—SHEET 2.

Witnesses
George E. Higham
Frank J. Phelen

Inventor
William H. Winslow
By Brown Williams
Attorneys

W. H. WINSLOW.
FLASH BOILER.
APPLICATION FILED NOV. 5, 1909.
1,065,419.
Patented June 24, 1913.
6 SHEETS—SHEET 3.
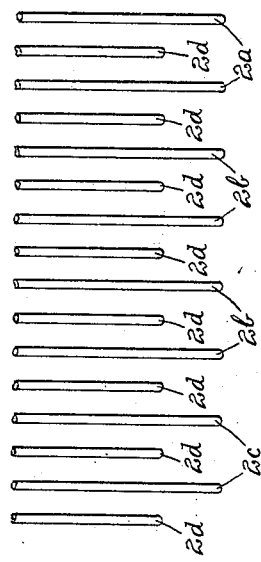
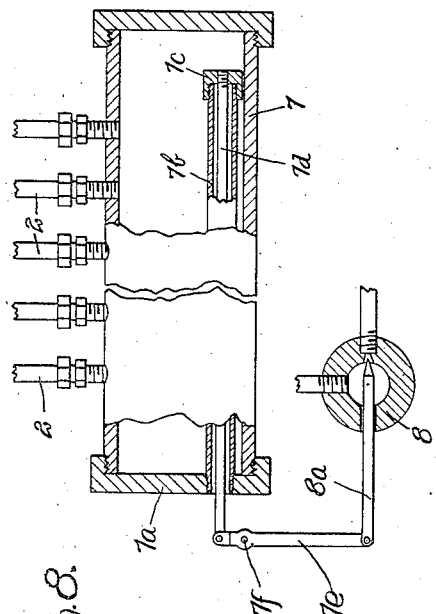
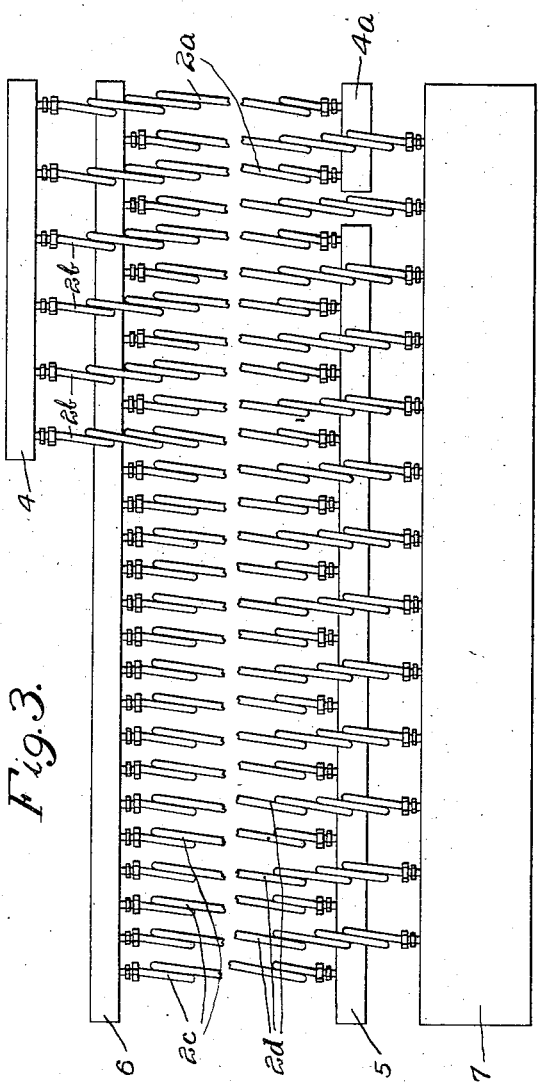
Witnesses
Inventor
William H. Winslow
By
Attorneys

W. H. WINSLOW.
FLASH BOILER.
APPLICATION FILED NOV. 5, 1909.

1,065,419.

Patented June 24, 1913.

6 SHEETS—SHEET 4.

Witnesses
George E. Higham
Frank J. Thelen

Inventor
William H. Winslow
By Browno Killi
Attorneys

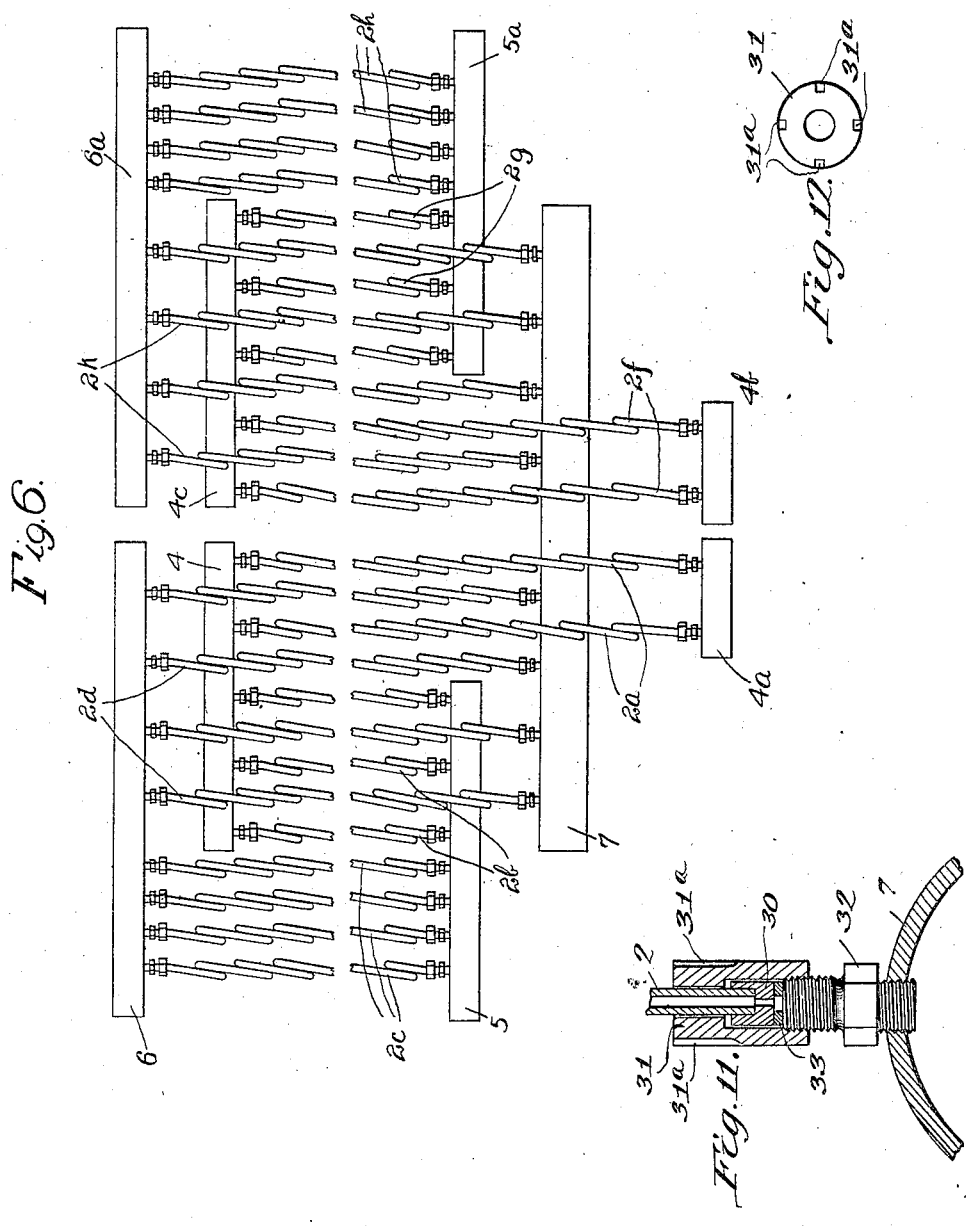

W. H. WINSLOW.
FLASH BOILER.
APPLICATION FILED NOV. 5, 1909.
1,065,419.
Patented June 24, 1913.
6 SHEETS—SHEET 6.
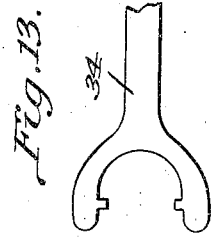
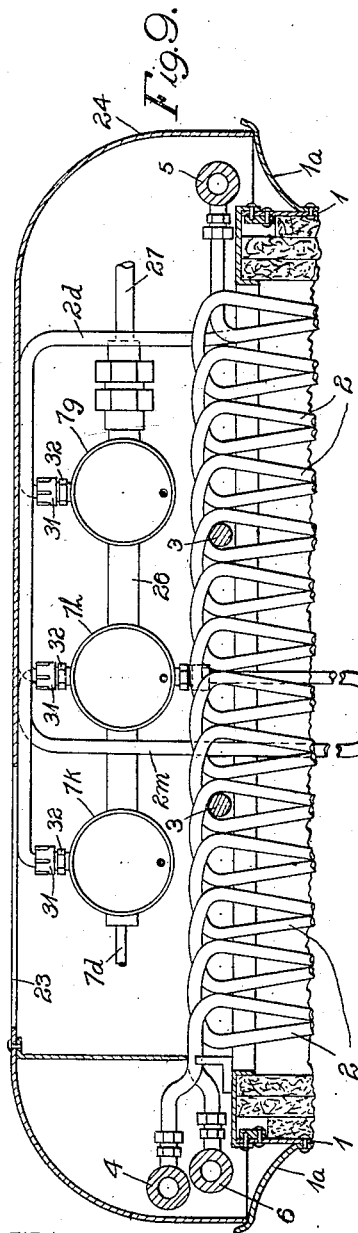
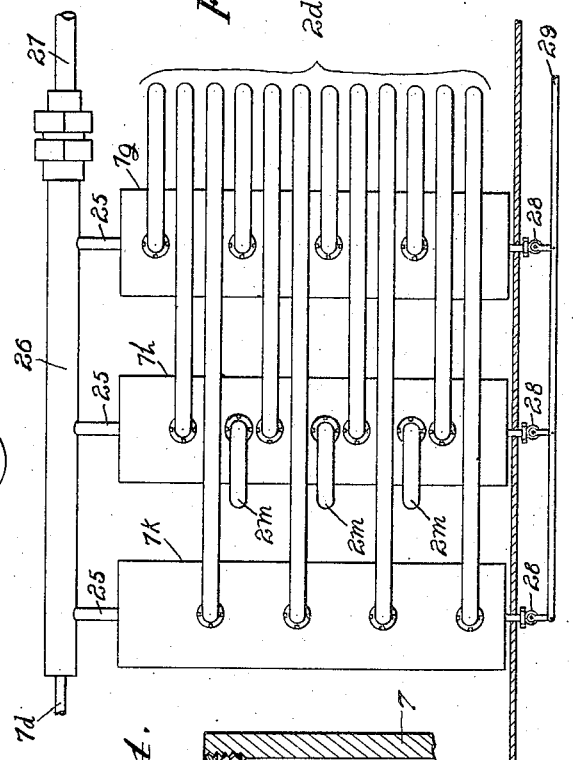
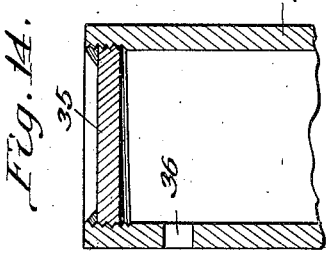
Witnesses
George E. Higham
Frank J. Thelen
Inventor
William H. Winslow
By Brown & Williams
Attorneys

UNITED STATES PATENT OFFICE.

WILLIAM H. WINSLOW, OF RIVER FOREST, ILLINOIS, ASSIGNOR TO THE STEAM POWER DEVICES COMPANY, OF CHICAGO, ILLINOIS, A CORPORATION OF ILLINOIS.

FLASH-BOILER.

1,065,419.    Specification of Letters Patent.    Patented June 24, 1913.

Application filed November 5, 1909. Serial No. 526,331.

*To all whom it may concern:*

Be it known that I, WILLIAM H. WINSLOW, a citizen of the United States, residing at River Forest, in the county of Cook and State of Illinois, have invented a certain new and useful Improvement in Flash-Boilers, of which the following is a full, clear, concise, and exact description, reference being had to the accompanying drawings, forming a part of this specification.

My invention relates to an improved form of flash boilers in which water is conveyed from a water header or receptacle through a plurality of parallel passage-ways to a steam header, from which the steam is taken and used as rapidly as it is made. The passage-ways employed consist preferably of looped metal tubes of small diameter arranged closely together over a burner adapted to furnish the necessary heat.

By my invention the number of tubes extending from the water header to the steam header increases as the steam header is approached, thus affording increased capacity for the condition of the steam as the water more and more completely transforms into steam. I also provide means during the passage of the water from the water header to the steam header for redistributing the water or water and steam among the several tubes used to conduct it, as a result of which all of the steam finally reaching the steam header is dry and superheated to the desired amount.

In carrying out my invention I find it desirable to lead the water from the water header through a comparatively small number of tubes to a first intermediate header in which the heated water is thoroughly mixed and from which it is led by a plurality of tubes of greater number than the number leading the water into the intermediate header. The second set of tubes in turn leads the water into a second intermediate header, into which the steam is communicated partly in the form of steam and partly in the form of water, this intermediate header serving to thoroughly mix the water and steam. From the second intermediate header I may either lead the wet steam directly through a final set of tubes to the steam header or to a third intermediate header, as desired, and in the latter case the third intermediate header serves to again thoroughly mix the steam and deliver it to a final set of tubes extending to the steam header. Each set of tubes consists of a larger number of tubes than the set before it, and the final set of tubes extending to the steam header consists preferably of a considerably larger number than the set preceding it, the effect being to amply accommodate the steam produced and superheated in the final set of tubes to the desired degree. The several sets of tubes are preferably led in opposite directions alternately over the burner employed, and so distributed among each other that any tendency to undue heating at one portion of the burner is compensated for by the water or steam in the next set of tubes since in the latter the hotter water or steam has been mixed with the cooler water or steam, and thus conveyed through the second set of tubes in uniform condition through the unequal heated zones and between the unequal heated tubes of the first set. Thus by the redistribution referred to each set of tubes serves to heat the portions of the preceding tubes that are too cool and to cool the portions of the preceding tubes that are too hot, and in this manner the action of the burner upon all of the tubes is so equalized that each of the tubes in the final set performs practically its full duty in making steam and superheating it, and it is therefore practically impossible with my improved construction for water to be introduced into the steam header.

A further object of my invention is to provide a duplicate arrangement, indicated above, one portion being connected to either end of a double acting pump and the tubes of the two portions being led from the last intermediate headers to a common steam header. This provides that with a comparatively slow acting pump a continuous and uniform quantity of steam may be produced, whereas, with a single set of paths from a water header to a steam header the pump strokes would necessarily need to be increased to secure the same degree of uniformity of operation. In connection with the arrangement of boiler tubes above described I employ thermostatic means associated with the steam header for controlling a portion of the heat developed by the burner, while, by means of the pressure developed in the steam header, I control the entire fire produced by the burner. In this manner I prevent the steam from becoming unduly hot, since with the fire reduced as it is by the operation of the thermostatic mechanism the remaining fire is not hot enough to excessively superheat the steam produced, and the supply of steam is regulated according to the demand by the pressure regulating mechanism which entirely shuts off the fire when the pressure reaches a predetermined amount. By this system of control I provide against the possibility of superheating the steam for a short time immediately upon the closure of the throttle before the thermostatic mechanism could respond to the almost instantaneous operation of the increase in temperature resulting from the rapid increase in pressure.

By my invention I also provide that the steam header may constitute a steam receptacle of some capacity located over the heating zone within which the boiler tubes are located, as a result of which the steam header is maintained in dry and superheated condition at all times when the boiler is in use. To provide against condensation in the steam receptacle when the boiler is temporarily in disuse, as, for instance, in connection with its use upon automobiles, in which case a pilot burner is always used, I provide separate heating tubes extending from the steam receptacle and adapted to be heated by the pilot burner, which tubes serve to maintain the steam in the steam receptacle in dry and partially superheated condition during such period of disuse of the boiler.

In addition to the above, several improved features of construction will appear as described in the specification below.

Figure 2:
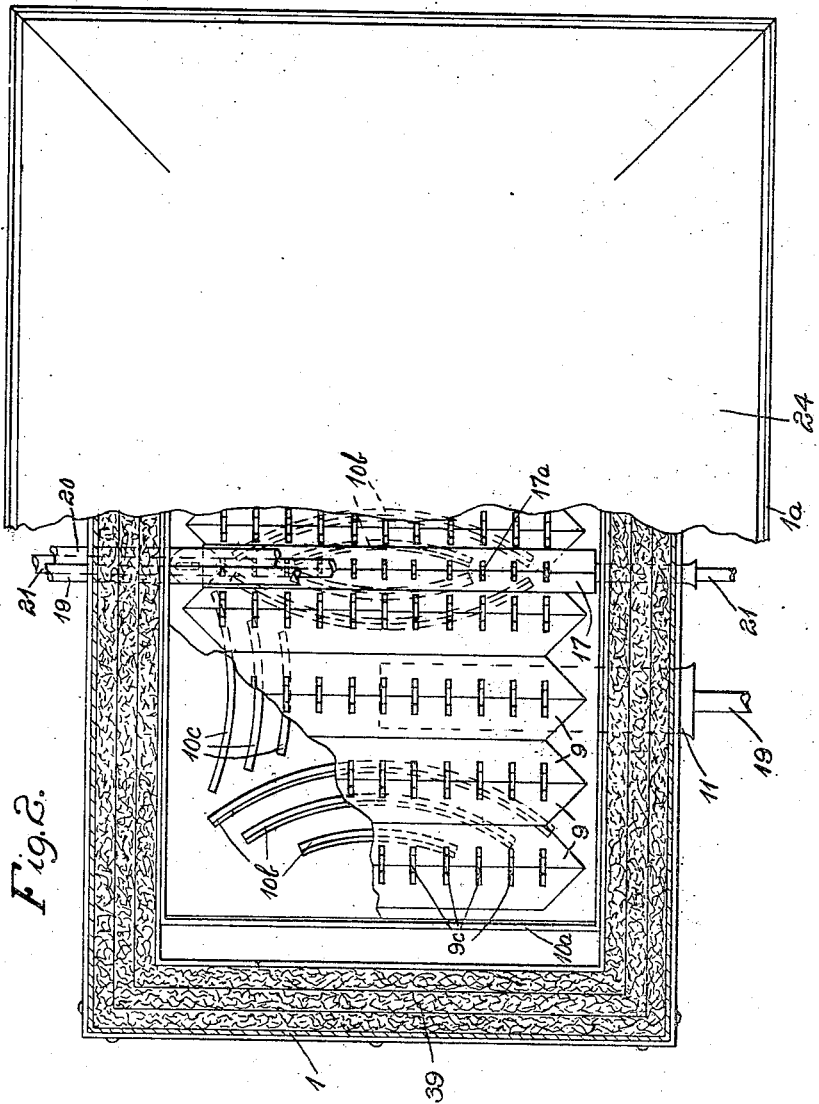
Figure 4:
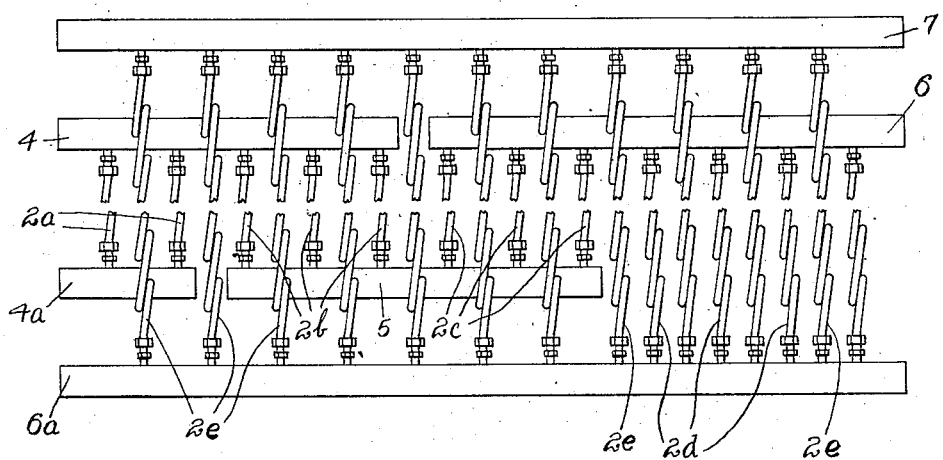
Figure 5:
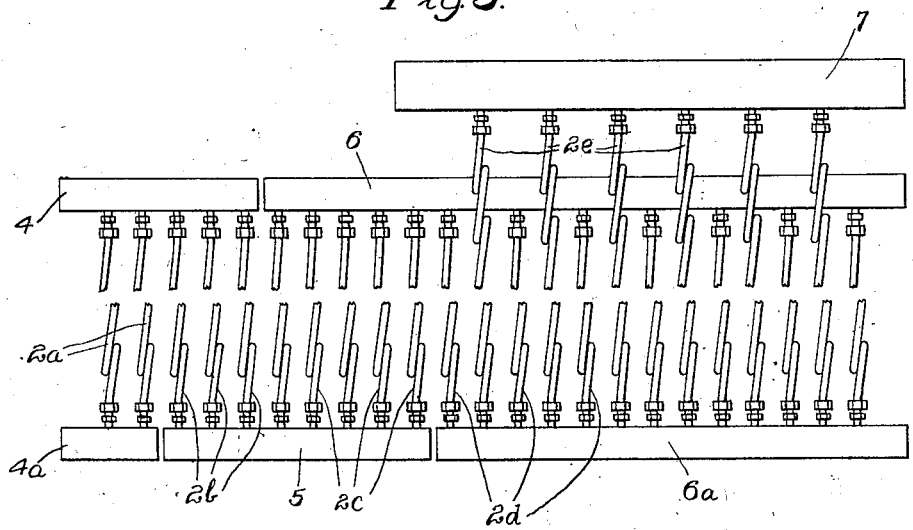

The several drawings illustrating my invention are as follows:

Figure 1 is a vertical sectional view through the boiler, showing the headers and tubes in place over the burner. Fig. 2 is a partial plan view and partial horizontal sectional view taken along the line 2—2 of the part shown in Fig. 1. Fig. 3 is a plan view of the headers and tubes removed from the boiler casing, the central portion of such tubes being broken away, the purpose of this view being to show the distribution of the successive passage-ways, first in one direction and then in the opposite direction across the boiler. Figs. 4, 5 and 6 are views similar to Fig. 3, showing modified arrangements of heating tubes and intermediate headers. Fig. 7 is a side elevation of a portion of the lower ends of the tubes shown in Fig. 3, and in this figure the tubes constituting the final run to the steam header are terminated farther from the burner than the other heating tubes. Fig. 8 is a view, partly in section, of the steam header, and shows a thermostatic mechanism that may be employed to control a portion of the fire produced by the burner. Fig. 9 shows a modified construction in which the single steam header shown in Fig. 1 is replaced by a plurality of headers located over the heating zone, which headers may serve to a limited extent as storage reservoirs for the steam produced. Fig. 10 shows, in plan view, the steam headers shown in Fig. 9, the remaining parts shown in the latter figure being removed for the sake of clearness. Fig. 11 is a view, partly in vertical section, through one of the union connectors that may be employed for connecting the heating tubes to the headers. Fig. 12 is a top view of the connecting sleeve forming a portion of the union connector shown in Fig. 11. Fig. 13 is a view of a spanner wrench adapted to operate the threaded sleeve shown in Fig. 12. Fig. 14 is a longitudinal sectional view taken through the axis of one of the headers shown in Fig. 9 for the purpose of indicating how the ends of these headers are closed.

Similar numerals refer to similar parts throughout the several views.

As shown in Figs. 1 and 2, the boiler consists essentially of a casing 1, within which the tubes 2 are supported. These tubes are disposed in vertical planes, each tube being bent in overlapping vertically disposed loops, which loops progress from one side of the boiler to the other, so that each tube thus formed lies in a vertical plane and occupies a space from the front to rear of the boiler of about double the outside diameter of the tube. The tubes 2 are placed in the boiler casing 1 as closely together as it is practical to place them, and in this position they are supported by rods 3—3 extending from front to rear across the top of the boiler casing. The tubes 2 are preferably arranged in different sets, the first set of which may extend from the header 4 across the boiler and terminate in the header 5. A second set may start from the header 5 and cross the boiler in the reverse direction of the first set and terminate in the header 6, and a third set may start from the header 6 and cross the boiler in the direction of the first set and terminate in the steam header 7. The different sets of tubes as they cross and recross the boiler are distributed among each other, as indicated in the diagrammatic view shown in Fig. 3. In this view the water header is shown at $4^a$, the first intermediate header at 4 and the tubes extending between such headers at $2^a$. The second set of tubes extending from the header 4 to the second intermediate header 5 is shown at $2^b$. The third set of tubes extending from the header 5 to the third intermediate header 6 is shown at $2^c$, and the fourth set of tubes extending from the intermediate header 6 to the steam header 7 is shown at $2^d$. The only difference between the diagrammatic arrangement shown in Fig. 3 and that indicated in Fig. 1 is that in Fig. 1 the water header 4ᵃ is not shown since it lies directly behind the intermediate header 5, and for the arrangement indicated in Fig. 1 the header 4 may either be a water header which is connected directly with the water pump, and the header 4ᵃ may be omitted, or the header 4 may be a first intermediate header connected directly to such water pump. The intermediate headers are provided in order that the water and steam produced may be equally distributed between the different tubes employed to convert the water into steam. As the water leaves the header 4ᵃ it is comparatively cold, and relatively to the steam that it will produce requires a comparatively smaller total cross-sectional area of tubes to accommodate it. A small number of tubes, therefore, is sufficient to accommodate the water in this condition to the first intermediate header 4 into which it is discharged, and as a result of the comparatively large cross-sectional area of the tube constituting the header 4 the water delivered into such header by the several tubes is thoroughly mixed before leaving the header by the second set of tubes 2ᵇ. The tubes 2ᵇ are more numerous than the tubes 2ᵃ, since in this passage over the burner steam is apt to be formed to a certain extent, and it is necessary, therefore, to provide a larger total cross-sectional area of passage-ways in order that the steam produced may be readily accommodated. The water and the steam produced in the tubes 2ᵇ are together delivered into the header 5 in which, as before, a thorough mixing process takes place, and the water and steam communicated to the tubes 2ᶜ are in uniform condition as to temperature. The steam, if it has been produced at all in the tubes 2ᵇ, is, of course, in very wet condition. In passing through the tubes 2ᶜ, which are more numerous than the tubes 2ᵇ in order to certainly accommodate all of the steam that may be produced without in any way retarding or interfering with the flow of the steam and water through the tubes, and, therefore, without decreasing the efficiency of the boiler, the remaining water is practically all converted into steam, and the steam thus produced is delivered into the header 6 in which it is thoroughly mixed and delivered, in uniform condition, to the final set of tubes 2ᵈ, which, again, are more numerous than the tubes 2ᶜ, for the reasons already indicated. In passing through the tubes 2ᵈ any particles of water remaining are converted into steam, with the result that dry steam is produced, and, further, this steam is superheated to any extent desired.

The number of sets of tubes used and the number of tubes in each set may be widely varied to meet different practical conditions, but in any event the arrangement should be such that an ample total heating surface is provided to wholly convert the water into steam and to superheat it to the desired degree when maximum demand is being made upon the boiler. It is also desirable that a sufficient number of intermediate headers be employed to keep the water and steam in thoroughly mixed and uniformly distributed condition as they pass repeatedly across the boiler over the fire.

It will be noticed that the successive sets of tubes shown in Fig. 3 are distributed among each other in such a manner that the tubes of one set are alternated with the tubes of other sets, the arrangement being such that the final set of tubes alternates with all of the other sets of tubes. The effect of this arrangement, which, of course, may be varied to produce any desired condition in a particular boiler construction, is that if for any reason the fire under the boiler is not uniform, and, therefore, some of the tubes of one set are heated hotter than the other tubes of the same set, the uniformly mixed water and steam flowing back between the tubes of this set in their next course across the boiler tend to cool the tubes of the first set that would otherwise be overheated. Similarly the uniformly distributed water and steam being hotter than the cooled ones of the tubes of a preceding set exert a heating effect upon such cooler tubes, and thus the entire operation is one that tends to make uniform the heating effect of the burner to equalize the heating effect of all of the tubes upon the water and steam.

In the arrangement of tubes shown in Fig. 4 the water header is shown at 4ᵃ, the first set of tubes at 2ᵃ extending to a first intermediate header 4, the second set of tubes 2ᵇ extending from the intermediate header 4 to a second intermediate header 5; the third set of tubes 2ᶜ extending from the intermediate header 5 to an intermediate header 6; a fourth set of tubes 2ᵈ extending from the header 6 to an intermediate header 6ᵃ, and a fifth set of tubes 2ᵉ extends from the intermediate header 6ᵃ to the steam header 7. Thus, the arrangement shown in this figure is similar to the arrangement shown in Fig. 3, except that an additional course of tubes is used and an additional intermediate header.

In the arrangement shown in Fig. 5 the number of sets of tubes and the number of intermediate headers is the same as that shown in Fig. 4, the difference being that the final course of tubes 2ᵉ is distributed only between the tubes of the preceding set of tubes 2ᵈ and not between the other sets of tubes, and for this reason the tubes 2ᵉ are comparatively few in number. This arrangement is of advantage in producing steam of a high degree of superheat in cases where the quantity of steam desired is not as great as may be the case in connection with the boiler constructed as indicated in Fig. 4.

In the arrangement of tubes shown in Fig. 6 two water headers, $4^a$ and $4^b$, are employed, each being connected by an independent set of tubes, $2^a$ and $2^f$, with intermediate headers 4 and $4^c$, from which independent second sets of tubes, $2^b$ and $2^g$, extend to second intermediate headers, 5 and $5^a$. Independent sets of tubes, $2^c$ and $2^h$, extend from the intermediate headers, 5 and $5^a$, to the intermediate headers 6 and $6^a$, from which independent final sets of tubes, $2^d$ and $2^k$, extend to a common steam header 7. This arrangement provides two independent series of sets of tubes leading from independent water headers to a common steam header, and are adapted for use in connection with a double-acting feed water pump, one end of the pump being connected to each of the water headers, $4^a$ and $4^b$. The arrangement of the tubes of each series among themselves is similar to that shown and described in connection with Fig. 3, with the exception that the final course of tubes, $2^d$ or $2^k$, is not distributed among the sets of tubes, $2^c$ or $2^h$.

As shown in Fig. 7, it is desirable under certain conditions to make the loop tubes $2^d$ shown in Fig. 3, shorter than the tubes of the other sets among which they are distributed in order that the tubes $2^d$ may not come as close to the fire under the boiler as do the earlier sets of tubes. In this way the steam after it has been produced is not subjected to as intense a heat as is the water before it is converted into steam, which is a desirable condition since much less heat is required to superheat the steam within practical operating limits after it is formed than is required to convert the water originally into such steam.

As indicated in Fig. 8, the steam header 7 has supported from one of its heads $7^a$ a comparatively small tube $7^b$ threaded into the head $7^a$ and extending into the steam header 7. The inner end of the tube $7^b$ has a plug $7^c$ secured to it, into which is threaded a rod $7^d$ extending to the left through the tubes $7^b$ and beyond the head $7^a$ of the steam header 7. The rod $7^d$ is connected to the upper end of a lever $7^e$ pivoted at $7^f$, the lower end of such lever being connected with a valve stem $8^a$ of the valve 8 used to control a portion of the fire in a manner to be explained. The tube $7^b$ and the rod $7^d$ are constructed of materials having different temperature and co-efficiencies of expansion, these materials being so chosen that for the construction indicated in Fig. 8 the rod $7^d$ has the higher expansion co-efficiency. This construction provides that the valve 8 may be operated by the temperature of the steam in the steam header 7 when it reaches a predetermined point, this construction being employed to prevent superheating the steam under conditions of small demand upon the boiler to a point that might carbonize the lubricating oil used in the engine.

As shown in Figs. 1 and 2 the burner consists of an upper corrugated plate 9 having downwardly extending flanges $9^a$ around its periphery adapted to rest upon the bottom plate 10 of the burner, such bottom plate being so conformed and disposed relatively to the top plate as to leave a compartment between the two plates for the reception of the fuel which is supplied to the burner by means of the mixing tubes 11 and 12. The bottom plate 10 is so bent, as indicated in Fig. 1, that it is farther from the upper plate 9 at the mixing tubes 11 and 12 than it is between such mixing tubes and outside of them. The side edges of the plate 10 are so disposed as to support the flanges $9^a$ of the upper plate 9, and outside of the flanges $9^a$ the plate 10 is flanged, as indicated at $10^a$ to retain the upper plate 9 in place. The central portion of the plate 10 is brought sufficiently near to the central portion of the plate 9 so that separating posts 13 may be used to support the upper plate 9 from the plate 10, and, further, that the two sections of the burner supplied by the mixing tubes 11 and 12 may be somewhat separated by the upwardly bent portion of the bottom plate 10. The plate 10 is separated from an outer plate 14 by means of insulating material, as asbestos, 15, and the outer plate 14 is conformed similarly to the plate 10 and extended beyond the latter plate so that its edges engage small z-bars 16 secured to the lower edges of the sides of the boiler casing 1, such z-bars serving as slides into which the plate 14 and the burner supported thereby may be placed or removed, as desired.

Between its two central corrugations $9^b$ the upper plate 9 supports a square tube 17 into the end of which a mixing tube 18 projects. The tube 17 is slotted along its upper angle, as indicated at $17^a$, and constitutes a pilot burner for heating the tubes 19, 20 and 21 used to supply fuel to the mixing tubes 11, 12 and 18 respectively. The upper angles of the corrugations formed in the upper plate 9 are slotted, as indicated at $9^c$, to permit the fuel delivered into the burner by the mixing tubes 11 and 12 to pass out from such burner and be consumed.

Deflecting ribs $10^b$ and $10^c$ are provided upon the upper surface of the plate 10 to cause the fuel to be evenly distributed into all of the corrugations of the upper plate 9 in order that a fire of uniform intensity may be produced.

As indicated in Fig. 1, a baffle plate 22 may be secured above the left-hand ends of the tubes 2 and below the outlet opening 23 formed in the cover 24 of the boiler. The effect of this plate is to cause the gases of combustion to thoroughly heat the right-hand portions of the tubes 2 before passing to the outlet opening, which it is to be desired since these are the portions that communicate directly with the steam header 7. The cover 24 is made so that it may be readily removed from the casing 1, being supported therefrom by bracket pieces 1ª, which removal may be accomplished without disturbing any of the tubes or headers.

For certain conditions of operation, particularly in connection with slow speed engines requiring a considerable quantity of steam, it is desirable to employ a steam header or headers of considerable capacity, and in order to do this without danger from the high pressures I contemplate using, the arrangement shown in Figs. 9 and 10 may be employed. In these figures the steam header 7 is replaced by three similar headers $7^g$, $7^h$ and $7^k$ which are connected at their rear ends and as nearly as possible to the bottoms of the headers by pipes 25 with a common header or pipe 26 of comparatively small capacity, from which connection is made by pipe 27 with the engine to be driven. In this modification the thermostatic mechanism is located in the header 26 as indicated. The final set of tubes $2^d$ is, in this case, so connected that the first, fourth, seventh, etc., terminate in the header $7^g$; the second, fifth, eighth, and so on, terminate in the header $7^h$, and the third, sixth, ninth, etc., terminate in the header $7^k$. The headers $7^g$, $7^h$ and $7^k$ are located over the portions of the tubes 2 directly subjected to the action of the fire, as a result of which such headers are kept consistently heated and the steam, therefore, is prevented from becoming wet if, for any reason, a comparatively small demand for steam is made upon the boiler.

To provide against the condensation of the steam in the headers when the fire is shut off, due to the stopping of the engine, I provide supplemental heating tubes extending from the header $7^h$, as indicated at $2^m$. These supplemental heating tubes extend from the bottom of the header $7^h$ between the tubes 2 to a point directly over the pilot burner 17 and upward from over such pilot burner to the top of the header $7^h$. Thus, if any of the steam condenses and forms in the bottom of the header $7^h$ it flows down through the tubes $2^m$ and is again converted into steam and delivered into the upper portion of the header. The pipes 25 and header 26 serve to communicate any water of condensation that may form in the headers $7^g$ and $7^k$ to the header $7^h$, and thus the tubes $7^m$ serve to maintain the steam in all three headers in dry condition. As a result, when it is desired to start the engine a considerable quantity of dry steam is at once available, and difficulty from water of condensation is avoided. If for any reason steam does condense in the headers $7^g$, $7^h$ and $7^k$, as, for example, after the pilot burner has been extinguished, this water may, if desired, be drained from the headers by means of the cocks 28 connected into the forward ends of the headers as close to the bottoms thereof as possible, which cocks are adapted to be operated by a common bar 29 from any suitable means not shown.

In order to provide against the difficulty experienced in using commercial union connectors to connect the heating tubes 2 with the different headers, which difficulty results from the high temperatures used, I have provided special union connectors for this purpose, the construction of which is indicated in Fig. 11. To the end of each of the tubes 2, which are preferably made of steel, I secure a steel collar 30 by brazing the two together. The inner end of the collar 30 is adapted to be engaged by the end of a counterbore formed in the steel sleeve 31 provided with an opening therethrough large enough to freely collar the tube 2. The counterbored portion of the tube 31 is threaded and adapted to engage the externally threaded steel coupling 32, the other end of which is threaded into wheel of one of the steel headers, as, for example, the header 7. A gasket 33 of comparatively soft metal, as, for example, copper, is provided between the collar 30 and the end of the coupling 32. The sleeve 31, with a plurality of slots $31^a$ formed in its outer surface, is adapted to be engaged by the spanner wrench 34 shown in Fig. 13. When the sleeve 31 is securely drawn up against the collar 30 and the gasket 33 is compressed between the collar 30 and the end of the coupling 32 it will be observed that a comparatively rigid structure of practically the same material is formed, as a result of which the entire structure will expand and contract together. Any slight inequalities in expansion and contraction are taken up by the gasket 33, but in practice these inequalities of expansion and contraction will be slight, since they will depend almost entirely upon the thickness of such gasket. In this way I am able to avoid difficulties heretofore experienced, and union connectors formed in the manner indicated will not be loosened by repeated expansion and contraction of the connectors due to heating and cooling the same. The means employed for securing the connectors in place or for removing them is particularly advantageous for the purposes herein shown since comparatively small space is available for operating the movable elements of the connectors.

The headers above described, and particularly the steam headers, which are of comparatively large diameter, may be constructed to advantage in the manner indicated in Fig. 14 in which the end of the header is internally threaded and a plug 35 secured therein somewhat beyond the end of the header. The hole 36 is drilled in the wall of the header 7 near the plug 35, and through the hole 36 brazing material is introduced and the plug 35 is securely brazed into position, such operation being continued until the brazing material just appears in the thread at the outside of the plug, at which time the brazing operation is discontinued. The plug 35 is further held in place by filling in the corner between the inside of the end of the header 7 and the outer face of the plug with a steel fillet welded in place in any suitable way, as, for instance, by means of the oxy-acetylene flame. The hole 36 is then plugged in a suitable way, the result being a very strong construction adapted to withstand high pressures.

From the arrangement of tubes and headers above described it will be seen that I have provided a construction by which, as the water and steam pass from the water header toward the steam header, there is developed in the intermediate headers a force independent of the initial force exerted upon the water in the water header, the force thus produced in the intermediate headers serving to propel water and steam through the remaining tubes and to effect the distribution of such water and steam through the remaining sets of tubes. This operation I find to be very effective in securing an efficient operation of the boiler.

While I have shown my invention in the particular embodiments herein described, I do not, however, limit myself to those constructions but desire to claim any equivalents that may suggest themselves to those skilled in the art.

What I desire to claim is:

1. In a boiler, the combination of a water header, a steam header, a plurality of tubes having vertically extending loops between the water header and the steam header, and means connected with such tubes between such headers for redistributing the water and steam contained therein.

2. In a boiler, a water header, a steam header, looped passages extending below the headers from the water header to the steam header, and means between such headers for redistributing the water and steam in such passages, the number of such passages increasing as the steam header is approached.

3. In a boiler, a water header, a steam header, a plurality of looped tubes extending from the water header to the steam header, and means connected with such tubes between such headers for redistributing the water and steam contained therein, the number of such tubes increasing as the steam header is approached.

4. In a boiler, the combination of a water header, a steam header, an intermediate header, a first set of looped passages below the water header for the flow of water from the water header to the intermediate header, and a second set of looped passages of larger number than the first set for the flow of water and steam from the intermediate header to the steam header.

5. In a boiler, the combination of a water header, a steam header, an intermediate header, such headers all located near the top of the boiler, a first set of parallel passages extending from the water header to the intermediate header, and a second set of parallel passages extending from the intermediate header to the steam header.

6. In a boiler, a water header, a steam header, an intermediate header, a first set of looped passages extending below the water header from the water header to the intermediate header, and a second set consisting of a larger number of looped passages than the first set extending from the intermediate header to the steam header.

7. In a boiler, a water header, a steam header, an intermediate header, a first set of parallel passages extending below the water header from the water header to the intermediate header, and a second set of parallel passages extending from the intermediate header to the steam header, such second set of passages distributed among the first set of passages.

8. In a boiler, the combination of a water header, a steam header, an intermediate header, a first set of parallel tubes having vertical loops below the water header for the flow of water from the water header to the intermediate header, and a second set of similar tubes of larger aggregate cross-section than the first set for the flow of water and steam from the intermediate header to the steam header.

9. In a boiler, the combination of a water header, a steam header, an intermediate header, such headers all located near the top of the boiler, a first set of parallel looped tubes extending below the headers from the water header to the intermediate header, and a second set of parallel looped tubes extending below the headers from the intermediate header to the steam header.

10. In a boiler, a water header, a steam header, an intermediate header, a first set of parallel looped tubes extending from the water header to the intermediate header, and a second set consisting of a larger number of parallel looped tubes than the first set extending from the intermediate header to the steam header.

11. In a boiler, a water header, a steam header, an intermediate header, a first set of parallel looped tubes extending below such water header from the water header to the intermediate header, and a second set of parallel looped tubes extending from the intermediate header to the steam header, such second set of looped tubes distributed among the first set of looped tubes.

12. In a boiler, the combination of two independent water headers near the top of the boiler, passages extending below the headers from each water header to an intermediate header, and passages from each intermediate header to a common steam header.

13. In a boiler, the combination of two independent water headers near the top of the boiler, passages extending below the headers from each water header to an intermediate header, and passages from each intermediate header to a common steam header, the latter passages having a larger total cross-section than the former passages.

14. In a boiler, two independent water headers, passages extending below the headers from each water header to an intermediate header, and passages from each intermediate header to a common steam header, the latter passages being of greater number than the former passages.

15. In a boiler, the combination of two independent water headers near the top of the boiler, a common steam header, and independent sets of passages below the water headers extending by different courses from such water headers to the steam header and an intermediate header in each set of passages.

16. In a boiler, the combination of two independent water headers near the top of the boiler, intermediate headers, a common steam header, and independent sets of passages extending below the water headers by different courses to and from such intermediate headers to such steam header.

17. In a boiler, the combination of two independent water headers, intermediate headers, a common steam header, such headers all located near the top of the boiler, and independent sets of passages extending below the water headers by different courses to and from such intermediate headers to such steam header, the passages extending from the intermediate headers to the steam header being of greater aggregate capacity than the passages entering the intermediate headers.

18. In a boiler, the combination of two independent water headers, tubes having vertical loops extending below such headers from each water header to an intermediate header, and similar tubes from each intermediate header to a common steam header.

19. In a boiler, the combination of two independent water headers, tubes having vertical loops extending from each water header to an intermediate header, and similar tubes from each intermediate header to a common steam header, the latter looped tubes having a larger total cross-section than the former looped tubes.

20. In a boiler, two independent water headers, looped tubes extending from each water header to an intermediate header, and looped tubes from each intermediate header to a common steam header, the latter looped tubes being of greater number than the former looped tubes.

21. In a boiler, the combination of two independent water headers, a common steam header, and independent sets of tubes having vertical loops extending below the water headers by different courses from such water header to the steam header.

22. In a boiler, the combination of two independent water headers, intermediate headers, a common steam header, and independent sets of tubes having vertical loops extending by different courses to and from such intermediate headers to such steam header.

23. In a boiler, the combination of two independent water headers, intermediate headers, a common steam header, and independent sets of tubes having vertical loops extending by different courses to and from such intermediate headers to such steam header, the looped tubes extending from the intermediate headers to the steam header being of greater aggregate capacity than the tubes entering the intermediate headers.

24. In a boiler, the combination of two independent water headers, a common steam header, such headers all located near the top of the boiler, independent sets of passages extending below the water headers by different courses from such water headers to the steam header, and means in each set of passages for redistributing the water and steam flowing therethrough.

25. In a boiler, two independent water headers, intermediate headers, a common steam header, and independent sets of passages extending below the water headers by different courses to and from such intermediate headers to such steam header, the passages extending from the intermediate headers to the steam header being of greater number than the passages entering the intermediate headers.

26. In a boiler, the combination of two independent water headers, a common steam header, independent sets of tubes having vertical loops extending by different courses from such water headers to the steam header, and means in each set of looped tubes for redistributing the water and steam flowing therethrough.

27. In a boiler, two independent water headers, intermediate headers, a common steam header, and independent sets of looped tubes extending by different courses to and from such intermediate headers to such steam header, the looped tubes extending from the intermediate headers to the steam header being of greater number than the looped tubes entering the intermediate headers.

28. In a boiler, the combination of a water header, a steam header, an intermediate header, such headers all located near the top of the boiler, a first set of parallel passages for the flow of water from the water header to the intermediate header, and a second set of parallel passages of larger aggregate cross-section than the first set for the flow of water and steam from the intermediate header to the steam header, such steam header disposed over the heating zone surrounding such passages and subject to the heating action of such zone.

29. In a boiler, the combination of two independent water headers near the top of the boiler, passages extending below such headers from each water header to an intermediate header, and passages from each intermediate header to a common steam header, such steam header disposed over the heating zone surrounding such passages and subject to the heating action of such zone.

30. In a boiler, the combination of two independent water headers, a common steam header, such headers all located near the top of the boiler, and independent sets of passages extending below the water headers by different courses from such water headers to the steam header, such steam header disposed over the heating zone surrounding such passages and subject to the heating action of such zone.

31. In a boiler, the combination of a water header, a steam header, a plurality of tubes extending in vertical loops below the water headers from the water header to the steam header, and means connected with such tubes between such headers for redistributing the water and steam contained therein, such steam header disposed over the heating zone surrounding such tubes and subject to the heating action of such zone.

32. In a boiler, the combination of two independent water headers, passages extending below such headers from each water header to an intermediate header, and passages from each intermediate header to a common steam header, the passages of one set distributed among the passages of another set to equalize the heating effect upon them.

33. In a boiler, the combination of two independent water headers, a common steam header, and independent sets of passages extending below the water headers by different courses from such water headers to the steam header, the passages of one set distributed among the passages of another set to equalize the heating effect upon them.

34. In a boiler, the combination of two independent water headers, a common steam header, independent sets of passages extending below the water headers by different courses from such water headers to the steam header, and means in each set of passages for redistributing the water and the steam flowing therethrough, the passages of one set distributed among the passages of another set to equalize the heating effect upon them.

35. In a boiler, a water header, steam headers, parallel passages extending below such headers from the water header to the steam headers, and means between such headers for redistributing the water and steam in such passages, such steam headers disposed over the heating zone surrounding such passages and subject to the heating action of such zone.

36. In a boiler, a water header, steam headers, an intermediate header, a first set of parallel passages below the water header for the flow of water from the water header to the intermediate header, and a second set of parallel passages of larger aggregate cross section than the first set for the flow of water and steam from the intermediate header to the steam headers, such steam headers disposed over the heating zone surrounding such passages and subject to the heating action of such zone.

37. In a boiler, a water header, steam headers, a plurality of tubes extending below the water header from the water header to the steam headers, and means connected with such tubes between such headers for redistributing the water and steam contained therein, such steam headers disposed over the heating zone surrounding such tubes and subject to the heating action of such zone.

38. In a boiler, a water header, steam headers, an intermediate header, a first set of parallel tubes below the water header for the flow of water from the water header to the intermediate header, and a second set of parallel tubes of larger aggregate cross section than the first set for the flow of water and steam from the intermediate header to the steam headers, such steam headers disposed over the heating zone surrounding such tubes and subject to the heating action of such zone.

39. In a boiler, a water header, a first set of vertically looped tubes of small cross section extending from such water header, a first intermediate header of comparatively large cross section with which such tubes are connected, a second set of vertically looped tubes of larger total cross section than the first set of tubes extending from such first intermediate header, a second intermediate header of comparatively large cross section with which the second set of tubes is connected, a third set of vertically looped tubes of larger total cross section than the second set of tubes extending from such second intermediate header, and a steam header with which the third set of tubes is connected, such steam header being of large cross section relatively to the other headers.

40. In a boiler, a water header, a first set of looped tubes of small cross section extending from such water header, a first intermediate header of comparatively large cross section with which such tubes are connected, a second set of looped tubes of larger number than the first set of tubes extending from such first intermediate header, a second intermediate header of comparatively large cross section with which the second set of tubes is connected, a third set of looped tubes of larger number than the second set of tubes extending from such second intermediate header, and a steam header with which the third set of tubes is connected, such steam header being of large cross section relatively to the other headers.

41. In a boiler, a water header, a first set of vertically looped tubes of small cross section extending from such water header, a first intermediate header of comparatively large cross section with which such tubes are connected, a second set of vertically looped tubes of larger total cross section than the first set of tubes extending from such first intermediate header, a second intermediate header of comparatively large cross section with which the second set of tubes is connected, a third set of vertically looped tubes of larger total cross section than the second set of tubes extending from such second intermediate header, and a steam header with which the third set of tubes is connected, such steam header being of large cross section relatively to the other headers and disposed over the heating zone surrounding such tubes and subject to the heating action of such zone.

42. In a boiler, a water header, a first set of looped tubes of small cross section extending from such water header, a first intermediate header of comparatively large cross section with which such tubes are connected, a second set of looped tubes of larger number than the first set of tubes extending from such first intermediate header, a second intermediate header of comparatively large cross section with which the second set of tubes is connected, a third set of looped tubes of larger number than the second set of tubes extending from such second intermediate header, and a steam header with which the third set of tubes is connected, such steam header being of large cross section relatively to the other headers and disposed over the heating zone surrounding such paths and subject to the heating action of such zone.

43. In a boiler, a water header, a first set of looped tubes of small cross section extending from such water header, a first intermediate header of comparatively large cross section with which such tubes are connected, a second set of looped tubes of larger total cross section than the first set of tubes extending from such first intermediate header, a second intermediate header of comparatively large cross section with which the second set of tubes is connected, a third set of looped tubes of larger total cross section than the second set of tubes extending from such second intermediate header, a steam header with which the third set of tubes is connected, such steam header being of large cross section relatively to the other headers and disposed over the heating zone surrounding such tubes and subject to the heating action of such zone, and looped tubes extending from such steam header through the heating zone and back to such header.

44. In a boiler, a water header, a first set of looped tubes of small cross section extending from such water header, a first intermediate header of comparatively large cross section with which such tubes are connected, a second set of looped tubes of larger number than the first set of tubes extending from such first intermediate header, a second intermediate header of comparatively large cross section with which the second set of tubes is connected, a third set of looped tubes of larger number than the second set of tubes extending from such second intermediate header, a steam header with which the third set of tubes is connected, such steam header being of large cross section relatively to the other headers and disposed over the heating zone surrounding such tubes and subject to the heating action of such zone, and looped tubes extending from such steam header through the heating zone and back to such steam header.

45. In a boiler, a water header, a steam header, parallel passages extending from the water header to the steam header, means between such headers for redistributing the water and steam in such passages, such steam header disposed over the heating zone surrounding such passages and subject to the heating action of such zone, and looped tubes extending from such steam header through the heating zone and back to such header.

46. In a boiler, a water header, steam headers, an intermediate header, a first set of parallel passages for the flow of water from the water header to the intermediate header, a second set of parallel passages of larger aggregate cross section than the first set for the flow of water and steam from the intermediate header to the steam headers, such steam headers disposed ov' the heating zone surrounding such passages and subject to the heating action of such zone, and looped tubes extending from such steam headers through the heating zone and back to such headers.

47. In a boiler, a water header, a steam header, an intermediate header, a first set of parallel looped tubes below the water header for the flow of water from the water header to the intermediate header, and a second set of parallel looped tubes of larger aggregate cross section than the first set for the flow of water and steam from the intermediate header to the steam header, the lower portions of the second set of tubes being higher than the lower ends of the first set of tubes.

48. In a boiler, a water header, a steam header, an intermediate header, a first set of parallel looped tubes extending from the water header to the intermediate header, and a second set of parallel looped tubes extending from the intermediate header to the steam header, the lower portions of the second set of tubes being higher than the lower ends of the first set of tubes.

49. In a boiler, a water header, a steam header, an intermediate header, a first set of parallel looped tubes for the flow of water from the water header to the intermediate header, and a second set of parallel looped tubes of larger aggregate cross section than the first set for the flow of water and steam from the intermediate header to the steam header, the lower portions of the second set of tubes being less subject to heating action than the first set of tubes.

50. In a boiler, a water header, a steam header, an intermediate header, a first set of parallel looped tubes extending from the water header to the intermediate header, and a second set of parallel looped tubes extending from the intermediate header to the steam header, the lower portions of the second set of tubes being less subject to heating action than the first set of tubes.

51. In a boiler, the combination of a water supply, a distributing header, a steam header, steam-producing coils between the distributing header and the steam header extending below such headers, and a heating coil or coils between the water supply and the distributing header adapted to nearly or quite convert the water supply into wet steam upon delivery to the distributing header.

52. In a boiler, the combination of a water header, a steam header, a plurality of flash coils extending in parallel arrangement from the water header to the steam header, and means inserted in the coils between such headers for redistributing the water and steam in such coils.

53. In a boiler, the combination of a water header, an intermediate header, a steam header, a first set of flash coils extending between the water header and the intermediate header, and a second set of flash coils extending from the intermediate header to the steam header.

54. In a boiler, the combination of a water header, an intermediate header, a steam header, a first set of flash coils extending between the water header and the intermediate header, and a second set of flash coils extending from the intermediate header to the steam header, such second set of flash coils being of greater number than the first set of coils.

55. In a boiler, the combination of a water header, an intermediate header, a steam header, a first set of vertically disposed flash coils extending between the water header and the intermediate header, and a second set of vertically disposed flash coils extending from the intermediate header to the steam header.

56. In a boiler, the combination of a water header, an intermediate header, a steam header, a first set of vertically disposed flash coils extending between the water header and the intermediate header, and a second set of vertically disposed flash coils extending from the intermediate header to the steam header, such second set of vertically disposed flash coils being of greater number than the first set of vertically disposed flash coils.

57. In a boiler, the combination of a water header, an intermediate header, a steam header, a first set of flash coils extending between the water header and the intermediate header, and a second set of flash coils extending from the intermediate header to the steam header, one or more of the flash coils comprising a tube of comparatively small bore bent in loops extending transversely across the boiler.

58. In a boiler the combination of a water header, an intermediate header, a steam header, a first set of flash coils extending between the water header and the intermediate header, and a second set of flash coils extending from the intermediate header to the steam header, such flash coils comprising tubes of comparatively small bore formed in loops extending transversely across the boiler.

59. In a boiler, the combination of a water header, an intermediate header, a steam header, a first set of flash coils extending between the water header and the intermediate header, and a second set of flash coils extending from the intermediate header to the steam header, such flash coils comprising tubes of comparatively small bore formed in loops extending transversely across the boiler, the coils of one set distributed among the coils of another set so as to equalize the heating effect upon the water and steam contained in such coils.

In witness whereof, I hereunto subscribe my name this 2nd day of November, A. D. 1909.

WILLIAM H. WINSLOW.

Witnesses:
ALBERT C. BELL,
ROBERT F. BRACKE.